United States Patent
Chen (10) Patent No.: US 10,686,623 B2
(45) Date of Patent: Jun. 16, 2020

(54) SYSTEM AND METHOD FOR DYNAMIC BI-DIRECTIONAL COMMUNICATION OVER A LOCAL INTERCONNECT NETWORK BUS

(71) Applicant: Bendix Commercial Vehicle Systems LLC, Elyria, OH (US)

(72) Inventor: Qing Chen, Coquitlam (CA)

(73) Assignee: Bendix Commercial Vehichle Systems LLC, Elyria, OH (US)

(*) Notice: Subject to any disclaimer, the term of this patent is extended or adjusted under 35 U.S.C. 154(b) by 0 days.

(21) Appl. No.: 15/795,735

(22) Filed: Oct. 27, 2017

(65) Prior Publication Data

US 2019/0132147 A1    May 2, 2019

(51) Int. Cl.
*H04L 12/40* (2006.01)
*H04L 12/413* (2006.01)
*H04L 29/12* (2006.01)

(52) U.S. Cl.
CPC .. *H04L 12/40032* (2013.01); *H04L 12/40013* (2013.01); *H04L 12/40143* (2013.01); *H04L 12/413* (2013.01); *H04L 61/2038* (2013.01); *H04L 2012/40234* (2013.01); *H04L 2012/40273* (2013.01)

(58) Field of Classification Search
CPC ......... G07C 5/008; G05B 15/02; H04L 12/40; H04L 12/40032; H04L 12/413; H04L 12/40013
See application file for complete search history.

(56) References Cited

U.S. PATENT DOCUMENTS

| 6,438,462 B1* | 8/2002 | Hanf ............... G06F 1/3203 |
| | | 340/693.4 |
| 9,260,024 B1* | 2/2016 | Lau .................... B60L 53/60 |
| 2006/0041348 A1* | 2/2006 | Liebl ................... G07C 5/008 |
| | | 701/31.5 |

(Continued)

FOREIGN PATENT DOCUMENTS

DE    102013225706 A1    6/2015

OTHER PUBLICATIONS

English language abstract of DE 10 2013 225 706 A1.
Machine translation of DE 10 2013 225 706 A1.

*Primary Examiner* — Asad M Nawaz
*Assistant Examiner* — Syed Ali
(74) *Attorney, Agent, or Firm* — Reising Ethington P.C.

(57) ABSTRACT

A controller forming one node of a local interconnect network in a vehicle and implementing a function associated with the vehicle is provided along with a method for communicating within the network. The controller includes a serial communication interface configured to communicate with a single wire serial communication bus through a local interconnect network transceiver. A processor coupled to the interface is configured to implement a process for transmitting data on the bus including determining whether the bus is in use by another node, generating, when the bus is not in use, a signal on the bus indicative of a forthcoming transmission, transmitting a predetermined portion of a frame of data on the bus, determining whether a data collision exists on the bus, transmitting, when a data collision does not exist, another predetermined portion of the frame, and terminating, when a data collision does exist, further transmission of the frame.

22 Claims, 4 Drawing Sheets (56) References Cited

U.S. PATENT DOCUMENTS

| | | | | |
|---|---|---|---|---|
| 2007/0110017 A1* | 5/2007 | Fulknier | .............. | H04L 45/00 |
| | | | | 370/338 |
| 2010/0270859 A1* | 10/2010 | Gong | .................. | B60L 3/0046 |
| | | | | 307/9.1 |
| 2011/0144840 A1* | 6/2011 | Ye | ........................... | B60K 6/28 |
| | | | | 701/22 |
| 2012/0039339 A1* | 2/2012 | Kurita | .................... | H04L 45/00 |
| | | | | 370/400 |
| 2012/0320892 A1* | 12/2012 | Moeller | ............... | H04W 4/021 |
| | | | | 370/338 |
| 2014/0355622 A1 | 12/2014 | Kishigami | | |
| 2016/0103780 A1* | 4/2016 | Dentamaro | ......... | G06F 13/4081 |
| | | | | 710/303 |
| 2017/0084088 A1* | 3/2017 | Reichardt | .............. | G07C 5/008 |
| 2017/0359195 A1* | 12/2017 | Bender | ................ | H04L 12/403 |
| 2018/0034912 A1* | 2/2018 | Binder | ................... | H04L 67/12 |
| 2019/0385057 A1* | 12/2019 | Litichever | ............... | G06N 3/08 |

* cited by examiner

SYSTEM AND METHOD FOR DYNAMIC BI-DIRECTIONAL COMMUNICATION OVER A LOCAL INTERCONNECT NETWORK BUS

BACKGROUND OF THE INVENTION a. Field of the Invention

This invention relates to communications between nodes of a local interconnect network in a vehicle. In particular, the invention relates to a system and method that enable each node on the network to access, and initiate communications on, a communication bus of the network.

b. Background Art

The increasing number of electronic systems in vehicles are often joined in one or more networks to permit communication among the systems and the sharing of information among systems. For example, most modern vehicles include a controller area network (CAN) linking various vehicle systems used in monitoring or controlling the engine, transmission, brakes, steering and other vehicle systems. The electronic systems used in certain applications (e.g., climate control, seat adjustment, mirror adjustment, etc.) do not necessarily require the bandwidth, performance, or fault tolerance levels implemented in a CAN. Therefore, many vehicles also include a local interconnect network (LIN) to connect these systems to one another and, in certain cases, to the CAN. The LIN is a serial communication network in which communications are passed over a single wire. A LIN lacks the bandwidth of a CAN, but is less costly to implement.

Because communication over a LIN network occurs over a single wire, communication protocols have been established to prevent the possibility of data collision and enable successful communication between nodes on the network. These communication protocols, however, have several drawbacks. First, it is difficult to remove or add nodes to the network because the node addresses must often be pre-programmed. Although it is possible for a master node to assign address addresses after power up to slave nodes using a technique known as Slave Node Position Detection (SNPD), this technique requires installation of an additional wire or switch thereby increasing the cost of the network. Second, because only one master node is permitted, the network lacks flexibility and other nodes on the network are not capable of initiating communications.

The inventors herein have recognized a need for a system and method for implementing a network in a vehicle that will minimize and/or eliminate one or more of the above-identified deficiencies.

BRIEF SUMMARY OF THE INVENTION

This invention relates to communications between nodes of a local interconnect network in a vehicle. In particular, the invention relates to a system and method that enable each node on the network to access, and initiate communications on, a communication bus of the network.

A controller configured to form a first node of a local interconnect network in a vehicle and to implement a function associated with the vehicle in accordance with one embodiment includes a serial communication interface configured for coupling to a local interconnect network transceiver and configured to transmit communications to and receive communications from a single wire serial communication bus through the local interconnect network transceiver. The controller further includes a processor coupled to the serial communication interface and configured to implement a process for transmitting data on the bus. The process includes determining whether the communication bus is in use by a second node of the local interconnect network. The process further includes generating, when the bus is not in use, a signal for transmission on the bus indicative of a forthcoming transmission from the controller. The process further includes transmitting a first predetermined portion of a frame of data on the bus and determining whether a data collision exists on the bus. The process further includes transmitting, when a data collision does not exist, a second predetermined portion of the frame of data on the bus and terminating, when a data collision does exist, further transmission of the frame of data.

A method for communicating within a local interconnect network in a vehicle accordance with one embodiment includes establishing a first node of the local interconnect network, the first node including a controller having a serial communication interface configured for coupling to a local interconnect network transceiver and configured to transmit communications to and receive communications from a single wire serial communication bus through the local interconnect network transceiver and a processor coupled to the serial communication interface. The method further includes implementing a process for transmitting data from the first node. The process includes determining whether the communication bus is in use by a second node of the local interconnect network. The process further includes generating, when the bus is not in use, a signal for transmission on the bus indicative of a forthcoming transmission from the first node. The process further includes transmitting, from the first node, a first predetermined portion of a frame of data on the bus and determining whether a data collision exists on the bus. The process further includes transmitting, from the first node when a data collision does not exist, a second predetermined portion of the frame of data on the bus and terminating, when a data collision does exist, further transmission of the frame of data from the first node.

A system and method in accordance the present teachings represent an improvement as compared to conventional vehicle communication systems and methods. In particular, the system and method enable dynamic assignment of network addresses without requiring the cost of an additional wire or switch. The system and method also permit each node on the network to act as a master in a master-slave relationship and permits each node to initiate communications on the network. Each node is able to initiate communications without authorization of the other nodes and without generating a request to the other nodes to halt transmissions thereby increasing the flexibility and efficiency of the network.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
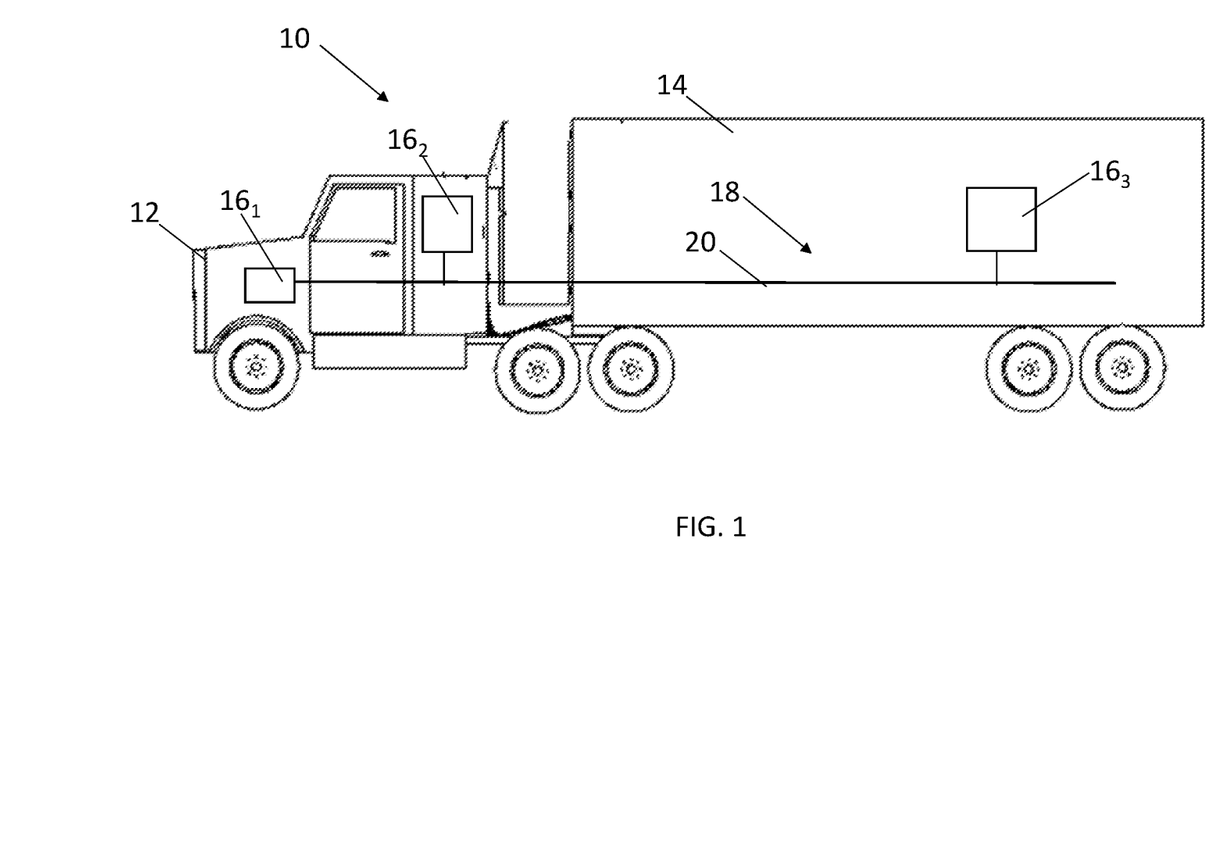
FIG. 1 is a diagrammatic view of a vehicle including a plurality of vehicle systems forming nodes in a local interconnect network in accordance with one embodiment.

Referring now to the drawings wherein like reference numerals are used to identify identical components in the various views, FIG. 1 illustrates a vehicle 10. In the illustrated embodiment, vehicle 10 comprises a tractor-trailer (also referred to as a semi) having two members—a truck or tractor 12 and a trailer 14. Tractor 12 contains a power unit, such as an internal combustion engine, and steering and drive axles. Trailer 14 is supported on one or more trailer axles, is provided to store freight and is detachably coupled to tractor 12. Although vehicle 10 is illustrated as a tractor-trailer, it should be understood that the teachings disclosed herein could be applied to a wide variety of vehicles including other commercial vehicles (e.g., buses) and non-commercial vehicles (e.g., cars, light trucks and sport utility vehicles). Vehicle 10 includes a wide variety of electronic systems $16_1 \ldots 16_N$ for use in implementing various vehicle functions including, for example, engine control, braking, steering, tire pressure monitoring and management, collision avoidance, cruise control, climate control, lighting, passenger seat adjustment, etc. Each of systems $16_1 \ldots 16_N$ may be connected to one or more other systems $16_1 \ldots 16_N$ in one or more networks through which the connected systems are capable of communicating with one another and sharing information. In one accordance with one aspect of the present teachings, a subset of systems $16_1 \ldots 16_N$ may be connected to form nodes of a local interconnect network 18 operating in the manner set forth hereinbelow. Network 18 is a serial communication network employing a single wire bidirectional 12V communication bus 20 that connects the nodes (systems 16) of network 18 and that is also connected to a positive battery node through a termination resistor and diode (not shown). Further information regarding bus 20 may be found in the LIN specification published by the LIN Consortium and in Standard J2602 published by SAE International.

Figure 2:
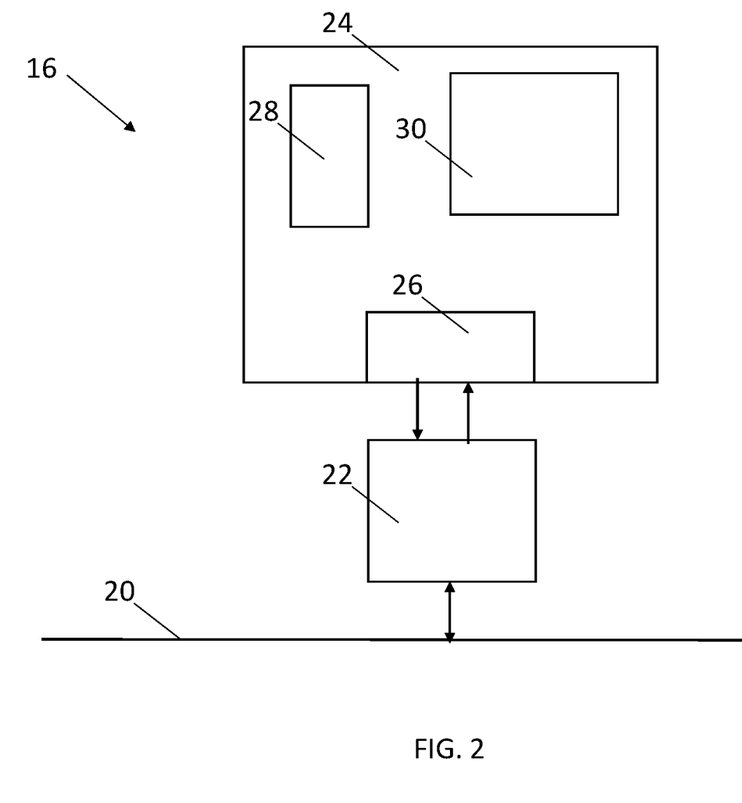
FIG. 2 is a diagrammatic view of one of the vehicle systems of the network in FIG. 1.

Referring now to FIG. 2, each system 16 or node on network 18 may include a local interconnect network transceiver 22 and a controller 24. It should be understood, however, that a system 16 on network 18 may include additional components such as sensors, actuators, and other elements depending on the function or purpose of system 16.

Transceiver 22 provides an interface between controller 24 and bus 20 of network 18. In one embodiment, the transceiver 22 may comprise the transceiver offered for sale by Maxim Integrated Products, Inc. under the name "MAX13021". It should be understood, however, that other transceivers could alternatively be used.

Controller 24 is configured to implement a function associated with vehicle 10. As referenced above, controller 24 may be configured to implement any of a wide variety of functions associated with vehicle 10 although these functions will typically be those that a relatively low bandwidth and reduced fault tolerance such as control of interior or exterior lighting, window wipers, mirrors, seats or cabin climate. Controller 24 may include an input/output interface 26, a memory 28 and a processor 30.

Interface 26 is configured for coupling controller 24 to transceiver 22 and is configured to transmit communications to and receive communications from bus 20 through transceiver 22. Interface 26 comprises a serial communications interface. Interface 26 may include a parallel to serial converter to convert parallel data from processor 30 to serial data for output to transceiver 22 and a serial to parallel converter to convert serial data received from transceiver 22 to parallel data for output to processor 30. In one embodiment, interface 26 comprises a universal asynchronous receiver transmitter (UART).

Memory 28 is provided to store a variety of data depending on the function performed by controller 24. Memory 28 may comprise a combination of volatile (e.g. random-access memory (RAM)) and non-volatile memory (e.g., read only memory (ROM), programmable read only member (PROM), electrically erasable programmable read only memory (EEPROM), flash memory) and may comprise a combination of permanent and rewritable memory. Memory 28 may store sensed conditions and parameter values; look-up tables and other data structures; software, firmware, programs, algorithms, scripts, and other electronic instructions; component characteristics and background information.

Processor 30 is provided to implement various processes used to perform the vehicle function implemented by controller 24. In accordance with aspects of the present teachings, processor 30 is also provided to implement a method for communicating within network 18 including processes to create and manage network 18 and to transmit and receive data on bus 20 of network 18. Processor 30 may comprise a central processing unit (CPU).

Figure 3:
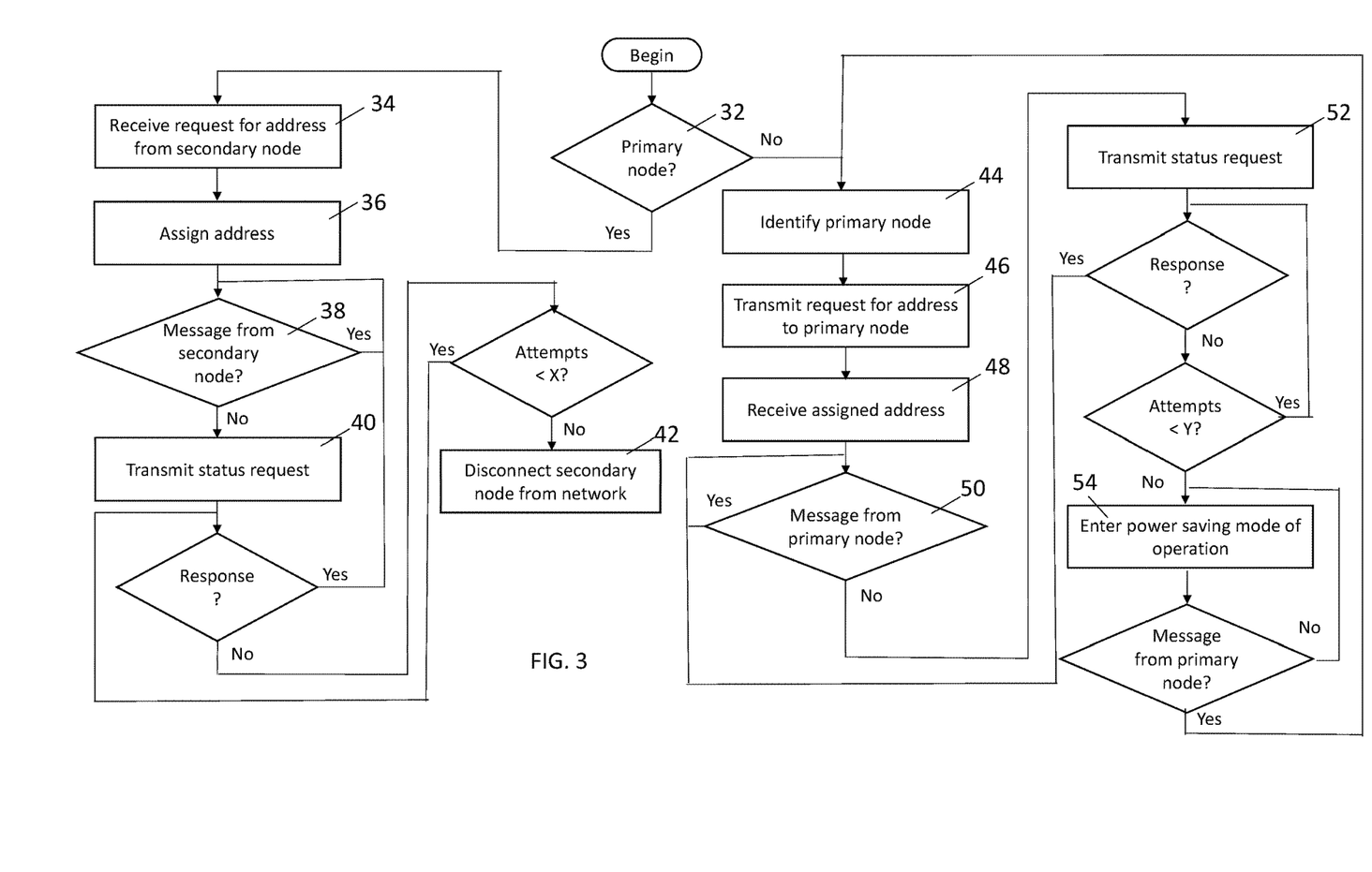
FIGS. 3-4 are flow chart diagrams illustrating portions of a method for communicating within a local interconnect network in a vehicle in accordance with one embodiment.
Figure 4:
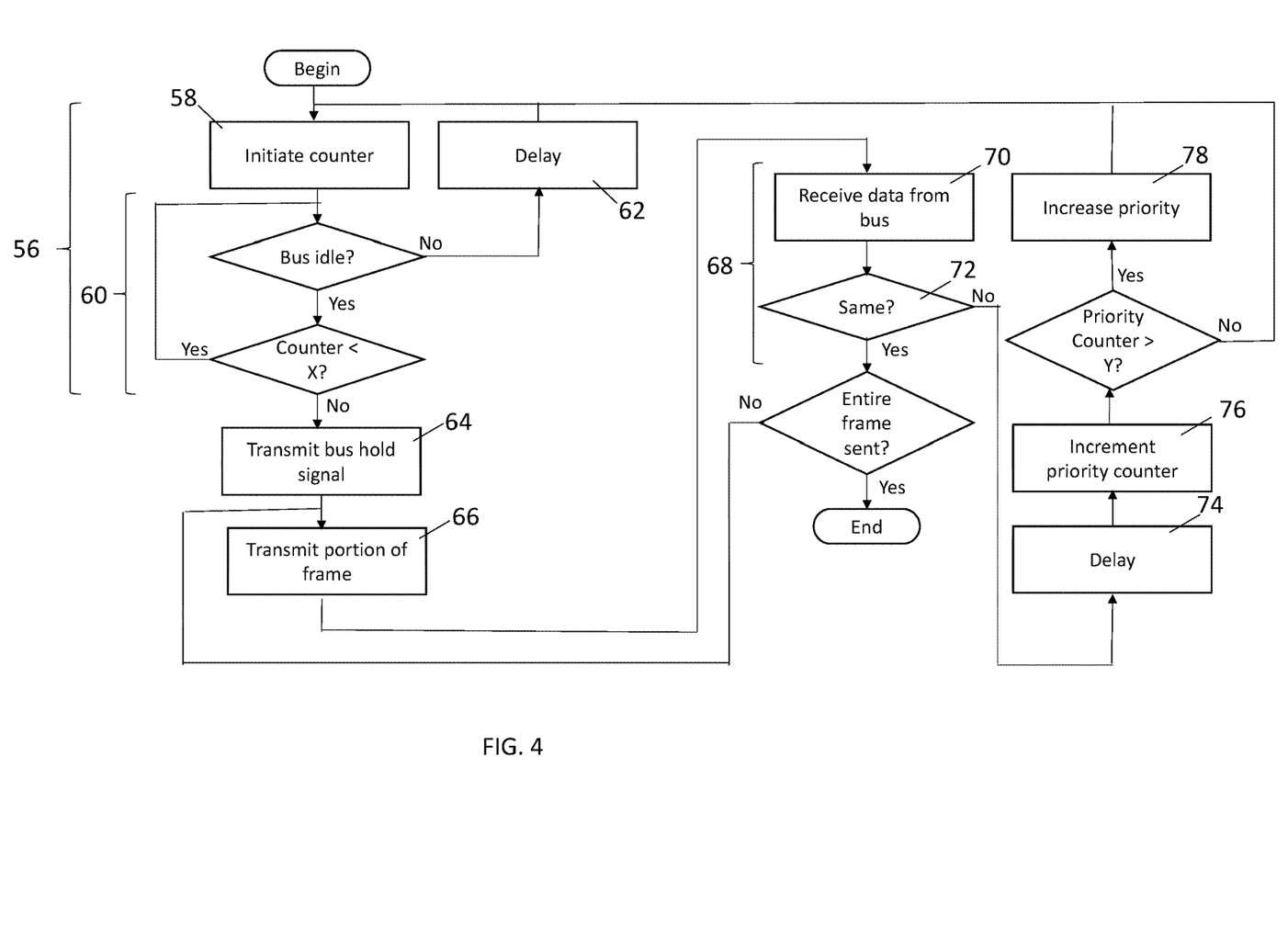

Referring now to FIGS. 3-4, in accordance with the present teachings, processor 30 may be configured with appropriate programming instructions (i.e., software or a computer program) to implement a method for communicating within network 18. The method may include a process for managing network 18 (FIG. 3) and a process for transmitting data on bus 20 (FIG. 4).

Referring to FIG. 3, in accordance with one aspect of the present teachings, each node on network 18 is capable of assuming any role defined in the communication protocol (e.g., as a master or a slave) and is capable of performing the defined functions for that role. Accordingly, in one embodiment, controller 24 may begin a process for managing network 18 with a step 32 of determining whether a given system 16 is functioning as a "primary" node that is responsible for setting up network 18 and assigning addresses to other nodes or a "secondary" node that must request assignment of an address. If controller 24 is part of a primary node, controller 24 may periodically perform steps 34, 36, in which controller 24 receives a request for an address from a secondary node on network 18 and assigns an address to the secondary node. The controller 24 for each node on network 18 may be configured such that the controller 24 is required to generate a message within a predetermined period of time following a prior message. If no information or commands are generated for transmission during this period of time, the message may comprise a simplified message confirming the continued existence of the node. Accordingly, controller 24 may be configured to perform the step 38 of monitoring bus 20 for a communication from the secondary node to which the primary node has assigned an address. If the controller 24 for the primary node does not receive a message from the secondary node, the controller 24 may perform the step 40 of transmitting a status request to the secondary node. In the absence of a response to the status request from the secondary node, the controller 24 for the primary node may repeat step 40 a predetermined number of times before performing the step 42 of disconnecting the secondary node from network 18.

If the controller 24 for a given node determines in step 32 that it is functioning as a secondary node, the controller 24 may begin by performing the step 44 of identifying the primary node in network 18. After identifying the primary node, the controller 24 may perform the steps 46, 48 of transmitting a request for an address to the primary node and receiving the assigned address. As noted above, the controller 24 for each node on network 18 may be configured such that the controller 24 is required to generate a message within a predetermined period of time following a prior message—either a message with information or commands or a simplified message confirming the continued existence of the node. Accordingly, controller 24 may be configured to perform the step 50 of monitoring bus 20 for a communication from the primary node that assigned the address to the secondary node. If the controller 24 for the secondary node does not receive a message from the primary node, the controller for the secondary node may perform the step 52 of transmitting a status request to the primary node. In the absence of a response to the status request from the primary node, the controller 24 for the secondary node may repeat step 52 a predetermined number of times before performing the step 54 of entering a power saving mode of operation (alternatively, the controller 24 for the secondary node may be configured to continue functioning as a standalone node on network 18). Once in the power saving mode operation, controller 24 perform the step 55 of monitoring bus 20 for a communication from the primary node. In the absence of a communication from the primary node, the secondary node remains in the power saving node. When a message from the primary node is received, controller 24 may return to step 44.

Referring now to FIG. 4, a method for communicating within network 18 may further include a series of steps to implement a process for transmitting data on the bus 20. In accordance with one aspect of the disclosed system, each node is capable of initiating a communication on bus 20 without authorization of the other nodes and without generating a request to the other nodes to halt transmissions. Accordingly, a controller 24 for any node on network 18 may begin by performing a step 56 of determining whether bus 20 is in use by another node on network 18. Step 56 may include several substeps 58, 60, 62. In substep 58, controller 24 may initiate a timer (e.g., an internal clock or software counter) that is configured to run for a predetermined period of time over which bus 20 must be idle before controller 24 can claim use of bus 20. In substep 60, controller 24 continuously monitors bus 20 for any communications on bus 20 over the predetermined period of time. If a communication from another node is detected within the predetermined period of time, controller 24 restarts the predetermined period of time (e.g. by resetting an internal clock or counter). In some embodiments, controller 24 may, in substep 62, introduce a predetermined or random delay before restarting the time in order to shift the controller's access requests from any recurring use of the bus 20 by another node.

If controller 24 does not detect any communications on bus 20 from other nodes on network 18 during the predetermined period of time (i.e., determines that bus 20 is not in use), controller 24 may, in step 64, generate a signal for transmission on bus 20 to hold or reserve bus 20 for a forthcoming transmission. The signal is generated by processor 30 and transmitted to bus 24 through interface 26 of controller 24 and transceiver 22. In one embodiment, the signal is derived from the header of a packet formed by the processor 30. The packet header may include information for generating the signal for holding the bus 20, a preamble, information on the type of message being sent, a message identifier, message priority information, the address of the sending node and destination node, the length of the body of the message and error detection codes (e.g., a cyclic redundancy check (CRC)). The packet body includes the payload or data/command. Once controller 24 has taken control of bus 20, controller 24 may perform the step 66 of transmitting a predetermined portion of a fame of data on bus 20. In one embodiment, the predetermined portion comprises one byte of data. In accordance with one aspect of the disclosed system, controller 24 is further configured to perform a step 68 in order to determine whether a data collision exists on bus 20. Because each node is capable of initiating communications on bus 20, controller 24 is configured to determine whether another node has initiated a contemporaneous communication using bus 20. In particular, controller 24 is configured to implement a form of a carrier sense multiple access with collision detection method governing transmission of data. Step 68 may include several substeps 70, 72. In substep 70, controller 24 receives data from bus 20. In substep 72, controller 24 compares the data received from bus 20 to the predetermined portion of the frame of data transmitted in step 66. If the data received from bus 20 differs from the portion of the frame of data transmitted in step 66, a collision has occurred.

If a collision is detected in step 68, controller 24 may terminate further transmission of the frame of data. Controller 24 may further be configured to repeat the foregoing steps in an attempt to transmit the same or a different message by returning to step 58. In some embodiments, controller 24 may, in step 74, implement a predetermined delay before returning to step 58. The amount of the delay may be based on the location of the collision within the data. For example, in one embodiment if a collision is detected at the first bit within one byte of data, the delay will be shorter than if a collision is detected in the second bit within the byte of data. More specifically, if two nodes transmit the equivalent of a binary five (i.e., 0000 0101) and binary six (i.e., 0000 0110), a collision will occur and each node will receive the equivalent of a binary four (i.e., 0000 0100) in return (with each of the two earliest (least significant value) bits defaulting to zero as a result of the collision). The node transmitting binary five will detect this collision at the first or least significant bit and will have a shorter delay than the node transmitting binary six which detects the collision at the higher bit. In some embodiments, controller 24 may perform additional steps to adjust the priority of a communication containing the frame of data depending on the number of collisions. Thus, in one embodiment, controller 24 may perform the step 76 of incrementing a priority counter each time a collision occurs when attempting to transmit the frame of data. If the priority counter meets a predetermined condition relative to a predetermined value (e.g., exceeds a certain number of attempts), controller 24 may be configured to increase the priority of the communication in step 78. Controller 24 may increase the priority of the communication by changing the value of one or more bits in the communication that are used to indicate the priority of the message. For example, in embodiments where a bit in a communication having a value of zero is given priority over a bit in another communication having a value of one, controller 24 may switch a priority or status bit that normally has a value of one to a value of zero to insure a collision and priority for the modified communication. If no collision is detected in step 68, controller 24 may return to step 66 to transmit the next portion of the frame of data and may repeat steps 66, 68, until the entire frame of data is transmitted on bus 20 or a data collision on bus 20 is detected.

A system and method in accordance the present teachings represent an improvement as compared to conventional vehicle communication systems and methods. In particular, the system and method enable dynamic assignment of network addresses without requiring the cost of an additional wire or switch. The system and method also permit each node on the network 18 to act as a master in a master-slave relationship and permits each node to initiate communications on the network 18. Each node is able to initiate communications without authorization of the other nodes and without generating a request to the other nodes to halt transmissions thereby increasing the flexibility and efficiency of the network.

While the invention has been shown and described with reference to one or more particular embodiments thereof, it will be understood by those of skill in the art that various changes and modifications can be made without departing from the spirit and scope of the invention.

What is claimed is:

1. A controller configured to form a first node of a local interconnect network in a vehicle and to implement a function associated with the vehicle, comprising:
   a serial communication interface configured for coupling to a local interconnect network transceiver and configured to transmit communications to and receive communications from a single wire serial communication bus through the local interconnect network transceiver; and
   a processor coupled to the serial communication interface and configured to implement a process for transmitting data on the bus including
      determining whether the communication bus is in use by a second node of the local interconnect network;
      generating, when the bus is not in use, a signal for transmission on the bus indicative of a forthcoming transmission from the controller;
      transmitting a first predetermined portion of a frame of data on the bus;
      determining whether a data collision exists on the bus;
      transmitting, when a data collision does not exist, a second predetermined portion of the frame of data on the bus; and
      terminating, when a data collision does exist, further transmission of the frame of data;
      wherein the processor is further configured, in determining whether the communication bus is in use, to monitor the bus for communications on the bus over a predetermined period of time.

2. The controller of claim 1 wherein the serial communication interface comprises a universal asynchronous receiver transmitter.

3. The controller of claim 1 wherein the processor is further configured, in determining whether the communication bus is in use, to restart the predetermined period of time after detecting a communication on the bus and a subsequent delay.

4. The controller of claim 1 wherein the processor is further configured, in determining whether a data collision exists on the bus, to: receive data from the bus; and compare the data received from the bus to the first predetermined portion of the frame of data.

5. The controller of claim 1 wherein the processor is further configured, when a data collision does exist, to repeat the process after a predetermined delay.

6. The controller of claim 1 wherein the processor is further configured, when a data collision does exist, to increase a priority of a communication containing the frame of data.

7. The controller of claim 1 wherein the processor is further configured to implement a process for managing the local interconnect network including receiving a request for an address from the second node of the local interconnect network; and, assigning an address to the second node.

8. The controller of claim 1 wherein the processor is further configured to implement a process for managing the local interconnect network including monitoring the bus for a communication from the second node; and transmitting a status request to the second node in the absence of a communication from the second node over a predetermined period of time.

9. The controller of claim 8 wherein the processor is further configured to disconnect the second node from the local interconnect network in the absence of a response to the status request from the second node.

10. The controller of claim 8 wherein the processor is further configured to enter a power saving mode of operation in the absence of a response to the status request.

11. The controller of claim 10 wherein the processor is further configured to monitor the bus for a communication from the second node when in the power saving mode of operation; and
   exit the power saving mode of operation when a communication from the second node is detected.

12. A method for communicating within a local interconnect network in a vehicle comprising the steps of:
   establishing a first node of the local interconnect network, the first node including a controller having a serial communication interface configured for coupling to a local interconnect network transceiver and configured to transmit communications to and receive communications from a single wire serial communication bus through the local interconnect network transceiver and a processor coupled to the serial communication interface; and,
   implementing a process for transmitting data from the first node including
      determining whether the communication bus is in use by a second node of the local interconnect network;
      generating, when the bus is not in use, a signal for transmission on the bus indicative of a forthcoming transmission from the first node;
      transmitting, from the first node, a first predetermined portion of a frame of data on the bus;
      determining whether a data collision exists on the bus;
      transmitting, from the first node when a data collision does not exist, a second predetermined portion of the frame of data on the bus; and
      terminating, when a data collision does exist, further transmission of the frame of data from the first node;
      wherein the step of determining whether the communication bus is in use includes the substep of monitoring the bus for communications on the bus over a predetermined period of time.

13. The method of claim 12 wherein the serial communication interface comprises a universal asynchronous receiver transmitter.

14. The method of claim 12 wherein the step of determining whether the communication bus is in use includes the substep of restarting the predetermined period of time after detecting a communication on the bus and a subsequent delay.

15. The method of claim 12 wherein the step of determining whether a data collision exists on the bus includes the substeps of: receiving data from the bus; and comparing the data received from the bus to the first predetermined portion of the frame of data.

16. The method of claim 12, further comprising the step of repeating the process when a data collision does exist after a predetermined delay.

17. The method of claim 12, further comprising the step of increasing a priority of a communication containing the frame of data when a data collision does exist.

18. The method of claim 12, further comprising the step of implementing a process for managing the local interconnect network including receiving a request for an address from the second node of the local interconnect network; and, assigning an address to the second node.

19. The method of claim 12, further comprising the step of implementing a process for managing the local interconnect network including monitoring the bus for a communication from the second node; and transmitting a status request to the second node in the absence of a communication from the second node over a predetermined period of time.

20. The method of claim 19 wherein the step of implementing a process for managing the local interconnect network further includes disconnecting the second node from the local interconnect network in the absence of a response to the status request from the second node.

21. The method of claim 19 wherein the step of implementing a process for managing the local interconnect network further includes entering a power saving mode of operation in the absence of a response to the status request.

22. The method of claim 21 wherein the step of implementing a process for managing the local interconnect network further includes: monitoring the bus for a communication from the second node when in the power saving mode of operation; and exiting the power saving mode of operation when a communication from the second node is detected.

* * * * *